No. 736,444.

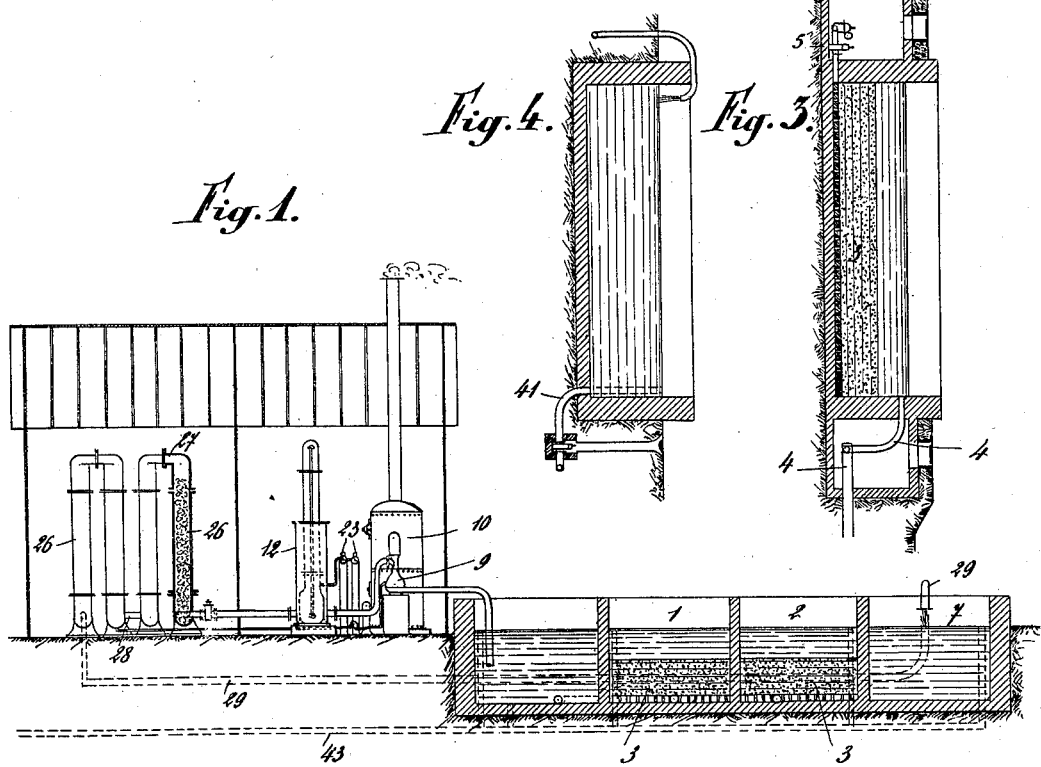
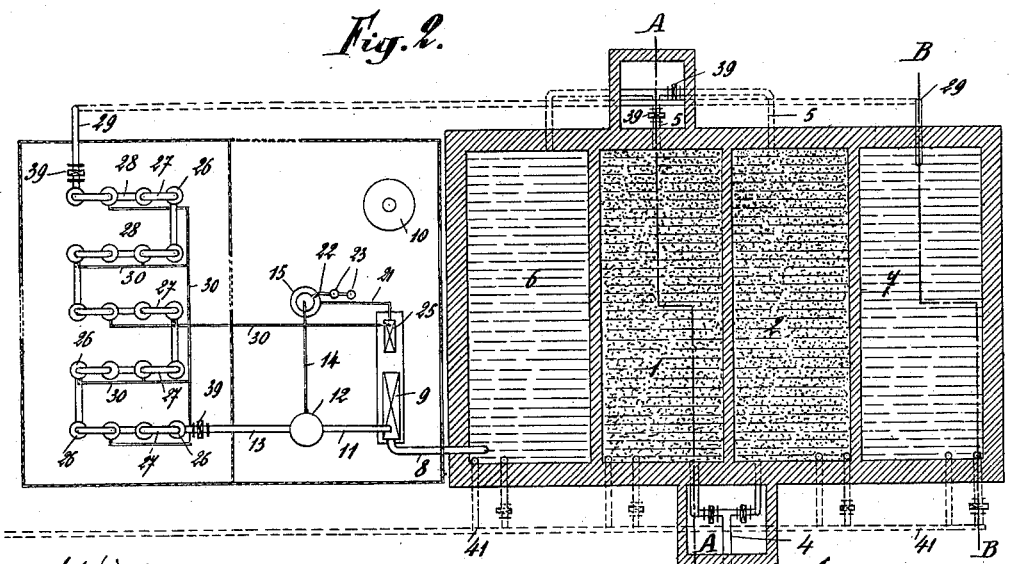

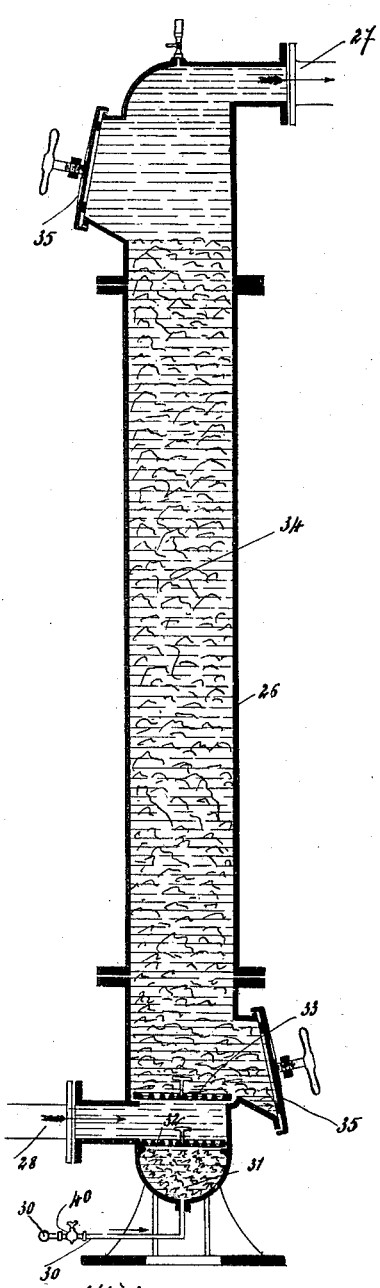
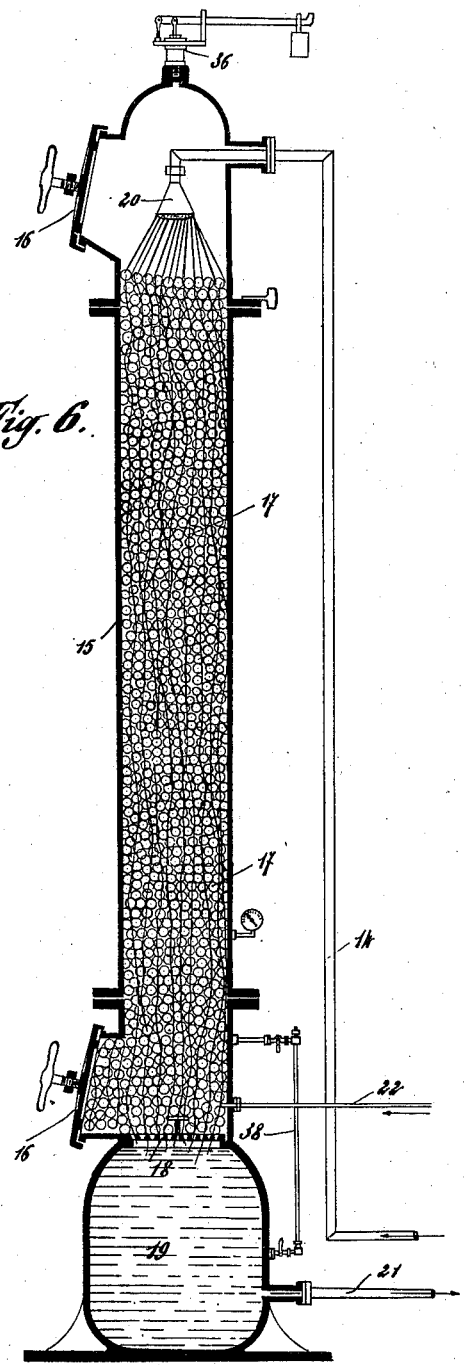

Patented August 18, 1903.

UNITED STATES PATENT OFFICE.

JULES EMMANUEL CHARLES ISIDORE PUTZEYS, OF BRUSSELS, BELGIUM.

PROCESS OF PURIFYING WATER.

SPECIFICATION forming part of Letters Patent No. 736,444, dated August 18, 1903.

Application filed April 17, 1902. Serial No. 103,280. (No specimens.)

*To all whom it may concern:*

Be it known that I, JULES EMMANUEL CHARLES ISIDORE PUTZEYS, engineer, a subject of the King of Belgium, residing at 18 Avenue de la Renaissance, Brussels, in the Kingdom of Belgium, have invented certain new and useful Improvements Relating to the Purification of Water, of which the following is a specification.

The object of this invention is to replace the phenomena of the purification of water which take place irregularly in calcareous rock by physical and chemical actions systematically regulated by human agency and to apply these actions both to the purification and to the sterilization of water obtained from doubtful sources and to the purification and sterilization of surface water.

I attribute the purification of water penetrating fissured calcareous rocks and reappearing in the form of a spring to a phenomenon consisting of mechanical filtration followed by chemical action in solution in water. Carbonic anhydrid in solution in water acts upon calcareous rocks, producing a soluble bicarbonate of lime which is easily decomposed again into the insoluble carbonate, precipitating and carrying down with it suspended matter, germs, &c. Basing my method upon this principle, I proceed to the purification of water in the following manner: I cause, first, separation of the water from its mechanical impurities by means of a more or less rapid filtration, according to the water which is being treated; second, a circulation of the water in a mass of calcareous rock of a suitable description, first charging it with carbonic anhydrid; third, the liberation of the carbonic anhydrid which is in excess with precipitation of calcareous salts. This may be done by aeration. These operations may be conveniently conducted in the manner illustrated by way of example in the accompanying drawings, in which—

Figure 1 is an elevation, partly in section, of an installation as a whole suited for the practical application of the invention. Fig. 2 is a plan view, partly in section, of this same installation. Fig. 3 is a section on the line A B of Fig. 2. Fig. 4 is a section on the line B B of Fig. 2. Fig. 5 is a vertical section, upon a larger scale, of one of the purifying-columns forming part of the installation represented in Figs. 1 and 2. Fig. 6 is a vertical section through a saturator, also forming part of the installation represented in Figs. 1 and 2.

In the drawings, 1 and 2 indicate the filtering-basins for the water to be treated, these basins being provided with a filtering medium 3 and with admission and discharge pipes 4 and 5 for the water to be treated and the filtered water, respectively.

6 is a basin into which the filtered water passes on leaving the filtering-basins 1 and 2.

7 is a basin for the reception of the water after it has been treated in accordance with my method.

8 is a pipe entering the basin 6 and connected to a pump 9, which may be actuated by means of a steam-motor supplied by the steam-generator 10, for example.

11 is the force-pipe of the pump 9, terminating at an air bell or dome 12, serving to regulate the passage of the water through the purifying appliances. The water escapes from this bell through two conduits 13 and 14. The conduit 14 terminates at the upper portion of a saturator 15, which is represented separately in Fig. 6. This saturator is composed of a vertical column closed at its lower and upper parts by means of autoclave or digester closing devices 16 and contains glass balls 17, supported upon a perforated bottom 18, beneath which is a chamber 19, formed in the base of the saturator. The water-supply pipe 14 enters the upper part of the saturator 15 and terminates in a rose 20, serving to spray the water upon the glass balls 17.

21 is a pipe for the discharge of the water which has traversed the saturator 15.

22 is a pipe for the supply of carbonic anhydrid, opening at the lower portion of the saturator 15 and connected to tubes 23, Figs. 1 and 2, containing carbonic anhydrid.

25 is a pump which draws the water from the chamber 19, arranged beneath the saturator 15, through the pipe 21.

26 represents purifying-columns, which are shown separately in Fig. 5. These columns are connected one with the other, so as to form a battery, alternately by pipes 27 at the upper portion and by pipes 28 at the lower portion. The first of these columns is connected by the pipe 13 to the bell 12 and the last by a pipe 29 to the basin 7. A pipe 30, connected to the pump 25, terminates at the lower portion of certain of the columns 26 in order to conduct there the water forced by the pump 25, as hereinafter described in detail. Each column 26, Fig. 5, incloses in its lower portion, into which opens the pipe 30, a mass, 31, of material resisting the attack of carbonic anhydrid. Above this mass 31 is arranged a perforated bottom 32 and above this latter a second perforated bottom 33, there being left between these two perforated bottoms a space into which enters the water passing from one column to another through the pipe 28. Each column 26 contains above its perforated bottom 33 pieces of suitably-selected calcium carbonate 34.

35 represents two autoclave or digester-closing devices for the columns 26, permitting them to be charged with the calcium carbonate and enabling the placing in position of the perforated bottoms 32 and 33 and the removal of the same.

36 is a safety-valve arranged at the upper part of the saturator 15.

37 is a pressure-gage arranged upon the saturator.

38 is a level-indicator permitting of regulating the height of the water in the chamber 19, arranged at the lower part of the saturator.

39 represents valves or cocks arranged upon the water supply and circulation pipes.

40 represents cocks permitting of regulating the flow of water in the pipe 30.

41 is a series of overflow-pipes for the basins 1, 2, and 7.

The installation as a whole thus constituted operates in the following manner: The water to be treated entering through the pipes 4 flows into the filtering-basins 1 and 2, from which it passes after being freed from its physical impurities or filtered more or less rapidly through the pipes 5 into the reservoir 6, into which enters the suction-pipe 8 of the pump 9. This latter sucks the filtered water and forces it through the pipe 11 into the regulating-bell 12, from which it is conducted through the pipe 13 into the purifying appliances 26 and through the pipe 14 into the saturator 15. This water trickles into the saturator upon the glass balls 17 and is thus brought into intimate contact with the carbonic anhydrid supplied from the tubes 23 and entering the saturator 15 through the pipe 22. The water thus saturated with carbonic anhydrid is drawn from the chamber 19 of the saturator 15 by the pump 25, which forces it through the pipe 30 and injects it under pressure into the lower part of the columns 26, in which this water, saturated with carbonic anhydrid, encounters the water to be purified, passing successively into the different columns through the pipes 27 and 28. This water injected under pressure into the current of water to be purified insures the mixing, which causes the attack of the limestone 34. The velocity of the passage and the duration of the contacts of the water with the limestone and the carbonic anhydrid in the purifying-columns 25 are regulated by the cocks 39. On its leaving the purifying-columns 26 the water is conducted through the conduit 28 into the reservoir 7, where, if necessary, it is freed by aeration from the carbonic anhydrid in excess with or without precipitation of the bicarbonates and with or without recuperation of the carbonic anhydrid liberated.

It is obvious that the number of the mechanical separators or filters and of the purifying and saturating appliances may vary, according to the nature of the installation and of the results desired. The same results may also be obtained by means of different arrangements of appliances, the principle remaining the same.

What I claim, and desire to secure by Letters Patent of the United States, is—

The method of purifying water which consists in mechanically filtering water, adding to it an aqueous solution of carbonic anhydrid passing the whole mixture through masses of calcium carbonate, whereby some portion of said calcium carbonate is dissolved, and finally aerating it to reprecipitate said calcium carbonate.

In testimony whereof I have hereunto set my hand, in presence of two subscribing witnesses, this 1st day of April, 1902.

JULES EMMANUEL CHARLES ISIDORE PUTZEYS.

Witnesses:
  GEORG BEDE,
  GREGORY PHELAN.